United States Patent
Kapoor et al.

(10) Patent No.: US 12,136,356 B2
(45) Date of Patent: Nov. 5, 2024

(54) USING COLLECTED USER DATA AND COGNITIVE INFORMATION TO GENERATE A SCENE SET IN A TRAINING ENVIRONMENT

(71) Applicant: International Business Machines Corporation, Armonk, NY (US)

(72) Inventors: Sumeet Surendra Kapoor, Pune (IN); Snehal U. Pansare, Pune (IN); Rachana Vishwanathula, Hyderabad (IN); Manoj Panda, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/112,999

(22) Filed: Feb. 22, 2023

(65) Prior Publication Data
US 2024/0282204 A1 Aug. 22, 2024

(51) Int. Cl.
*G09B 5/02* (2006.01)
*G06F 3/01* (2006.01)

(52) U.S. Cl.
CPC .............. *G09B 5/02* (2013.01); *G06F 3/017* (2013.01)

(58) Field of Classification Search
CPC .. G09B 5/00; G09B 5/02; G06F 3/017; G06F 3/00
See application file for complete search history.

(56) References Cited

U.S. PATENT DOCUMENTS

| 10,912,983 | B2 | 2/2021 | Bostick et al. |
| 11,017,691 | B2 | 5/2021 | Belch et al. |
| 11,468,785 | B2 | 10/2022 | Levenberg |
| 11,754,372 | B2 * | 9/2023 | Gallery ................ F41G 3/2611 434/20 |

(Continued)

FOREIGN PATENT DOCUMENTS

| CN | 111897426 A | 11/2020 |
| CN | 114504801 A | 5/2022 |

(Continued)

OTHER PUBLICATIONS

Inamdar, T., "Simulation for Sports Training," Linkedin, Nov. 19, 2020, 8 pages, retrieved from https://www.linkedin.com/pulse/simulation-sports-training-tanveer-inamdar-.

(Continued)

*Primary Examiner* — Timothy A Musselman
(74) *Attorney, Agent, or Firm* — Zilka-Kotab, P.C.

(57) ABSTRACT

A computer-implemented method, according to one embodiment, includes collecting user data associated with a first user's thoughts and/or experience with a first activity, and receiving, from a neural device paired with the first user, cognitive information about the first activity. The method further includes generating, based on the collected user data and the cognitive information, a scene set in a training environment based on the first activity. The generated scene is output to a hologram device for displaying the scene for the first user. A computer program product, according to another embodiment, includes a computer readable storage (Continued)

medium having program instructions embodied therewith. The program instructions are readable and/or executable by a computer to cause the computer to perform the foregoing method.

20 Claims, 5 Drawing Sheets

(56) References Cited

U.S. PATENT DOCUMENTS

| | | | |
|---|---|---|---|
| 2006/0281061 | A1 | 12/2006 | Hightower et al. |
| 2008/0275358 | A1 | 11/2008 | Freer et al. |
| 2016/0077547 | A1 | 3/2016 | Aimone et al. |
| 2019/0134506 | A1 | 5/2019 | Gupta et al. |
| 2021/0223864 | A1* | 7/2021 | Forsland .................. G06F 1/163 |
| 2022/0379207 | A1* | 12/2022 | Moyal ..................... G06T 11/00 |

FOREIGN PATENT DOCUMENTS

| | | |
|---|---|---|
| KR | 102030747 B1 | 10/2019 |
| TW | 201503934 A | 2/2015 |

OTHER PUBLICATIONS

Strivr, "Game Situation Training With Virtual Training Systems," Strivr, 2022, 28 pages, retrieved from https://www.strivr.com/solutions/industries/sports/.

Recode, "NFL quarterbacks are using VR to try to be the next Tom Brady," YouTube, Feb. 8, 2017, 3 pages, retrieved from https://www.youtube.com/watch?v=2JW4MLTELEc.

Zhang et al., "Application of Adaptive Virtual Reality with AI-Enabled Techniques in Modern Sports Training," Hindawi Mobile Information Systems, 2021, 10 pages.

Lv et al., "Application of Virtual Reality Technology Based on Artificial Intelligence in Sports Skill Training," Hindawi Wireless Communications and Mobile Computing, 2022, 7 pages.

Technolobe, "VR Cricket Gaming by iB Cricket: Incredible!" YouTube, Feb. 2, 2020, 5 pages, retrieved from https://www.youtube.com/watch?v=qMTO3znuCDE.

Hec Science & Technology, "Imagery-Assisted Virtual Reality for Athletic Training," YouTube, Mar. 8, 2018, 3 pages, retrieved from https://www.youtube.com/watch?v=PToEedE3H6k.

* cited by examiner

USING COLLECTED USER DATA AND COGNITIVE INFORMATION TO GENERATE A SCENE SET IN A TRAINING ENVIRONMENT

BACKGROUND

The present invention relates to visualization, and more specifically, this invention relates to using collected user data and cognitive information to generate a scene set in a training environment based on a predetermined activity.

In any industry, visualization matters in that people tend to be relatively more productive as a result of visualizing things in a specific manner. For example, while someone is training for cricket, practice sessions usually include nets and a bowling machine. These practice sessions can be relatively much more productive when conducted on an actual cricket field and an actual player is bowling. Similarly, various other activities are associated with one or more aspects that lead to a person participating in one or more of such activities being more productive.

Depending on where people live and/or are located at any given time, participating, e.g., practicing, in an activity may be relatively difficult to do. For example, someone training for the sport of cricket may be geographically located relatively far from a cricket field and/or practice facility, e.g., such that commuting to the cricket field and/or practice facility is not feasible. As a result, this person may experience difficulties in practicing the activity of cricket, which likely negatively impacts their confidence and future cricket performances. Accordingly, there is a need for techniques that expand access to activities.

SUMMARY

A computer-implemented method, according to one embodiment, includes collecting user data associated with a first user's thoughts and/or experience with a first activity, and receiving, from a neural device paired with the first user, cognitive information about the first activity. The method further includes generating, based on the collected user data and the cognitive information, a scene set in a training environment based on the first activity. The generated scene is output to a hologram device for displaying the scene for the first user.

A computer program product, according to another embodiment, includes a computer readable storage medium having program instructions embodied therewith. The program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using collected user data and cognitive information to generate a scene set in a training environment based on a predetermined activity.

In one general embodiment, a computer-implemented method includes collecting user data associated with a first user's thoughts and/or experience with a first activity, and receiving, from a neural device paired with the first user, cognitive information about the first activity. The method further includes generating, based on the collected user data and the cognitive information, a scene set in a training environment based on the first activity. The generated scene is output to a hologram device for displaying the scene for the first user.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
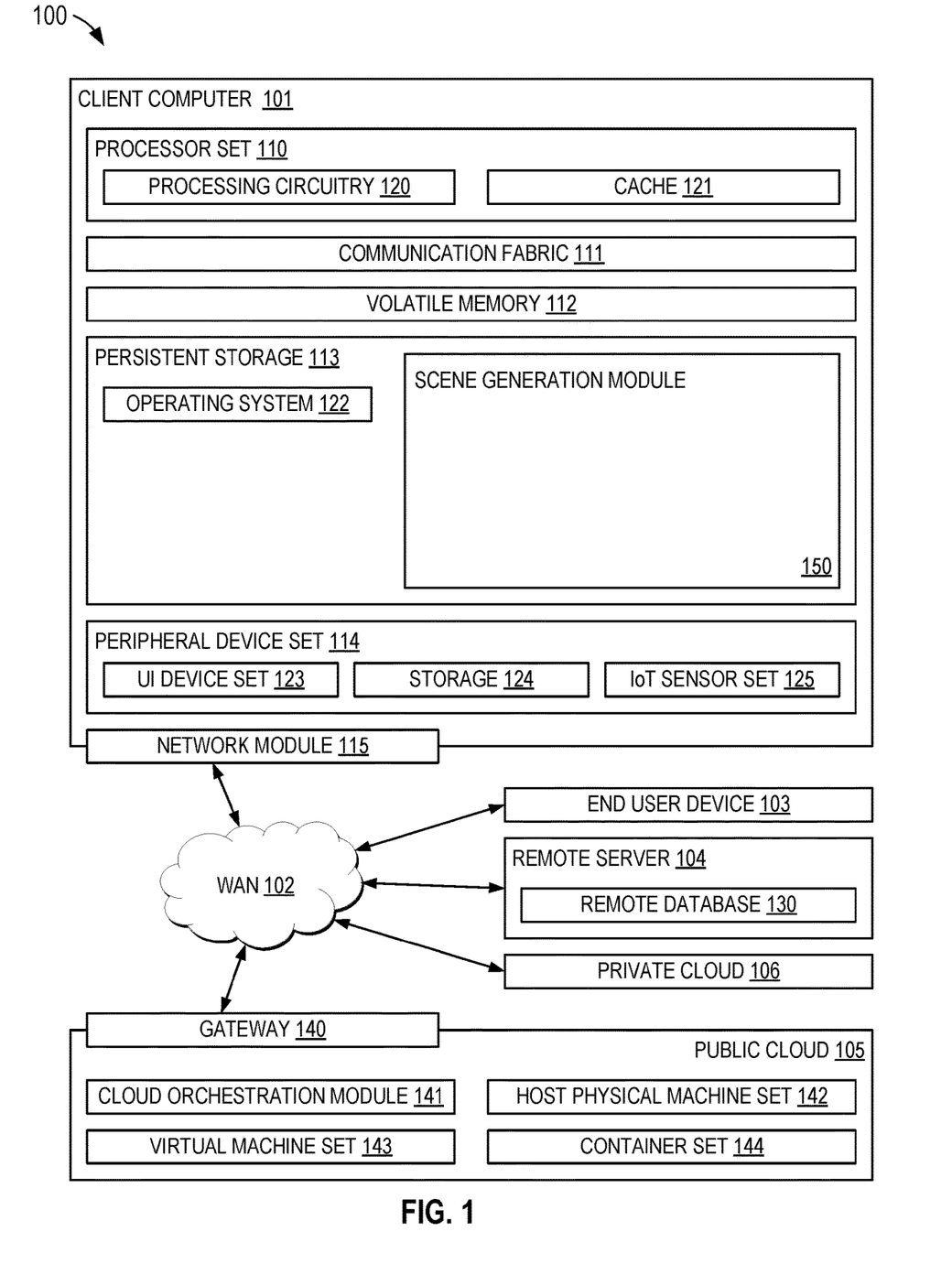
FIG. 1 is a diagram of a computing environment, in accordance with one embodiment of the present invention.

Computing environment 100 contains an example of an environment for the execution of at least some of the computer code involved in performing the inventive methods, such as scene generation module of block 150 for using collected user data and cognitive information to generate a scene set in a training environment based on a predetermined activity. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, in any industry, visualization matters in that people tend to be relatively more productive as a result of visualizing things in a specific manner. For example, while someone is training for cricket, practice sessions usually include nets and a bowling machine. These practice sessions can be relatively much more productive when conducted on an actual cricket field and an actual player is bowling. Similarly, various other activities are associated with one or more aspects that lead to a person participating in one or more of such activities being more productive.

Depending on where people live and/or are located at any given time, participating, e.g., practicing, in an activity may be relatively difficult to do. For example, someone training for the sport of cricket may be geographically located relatively far from a cricket field and/or practice facility, e.g., such that commuting to the cricket field and/or practice facility is not feasible. As a result, this person may experience difficulties in practicing the activity of cricket, which likely negatively impacts their confidence and future cricket performances. Accordingly, there is a need for techniques that expand access to activities.

In sharp contrast to the shortcomings of the conventional fields described above, techniques of embodiments and approaches described herein may be used to simulate scenarios based on conditions for a user to train well and relatively better prepare for activities, while keeping in mind productivity factors. More specifically, some of such techniques capture data from various sources such as personal computing devices, smart home devices and assistants, web, mobile applications, video streams from participation in past activities, live games, etc., to profile a user. Once the user data is captured, in some approaches, advanced AI techniques and/or models may be caused to generate a profile of the user for relative strengths, weaknesses, physical conditions, mental conditions, etc. Similarly, a database of profiles for other users may be captured in these techniques to simulate various conditional scenarios for the users using techniques such as, e.g., holography, robotic devices, etc. These scenarios may be further induced in the user through brain controlled interfaces, e.g., such as NEURALINK. Furthermore, eventually the user is recommended a course of actions, e.g., such as how to overcome certain situations and master the activity.

Figure 2A:
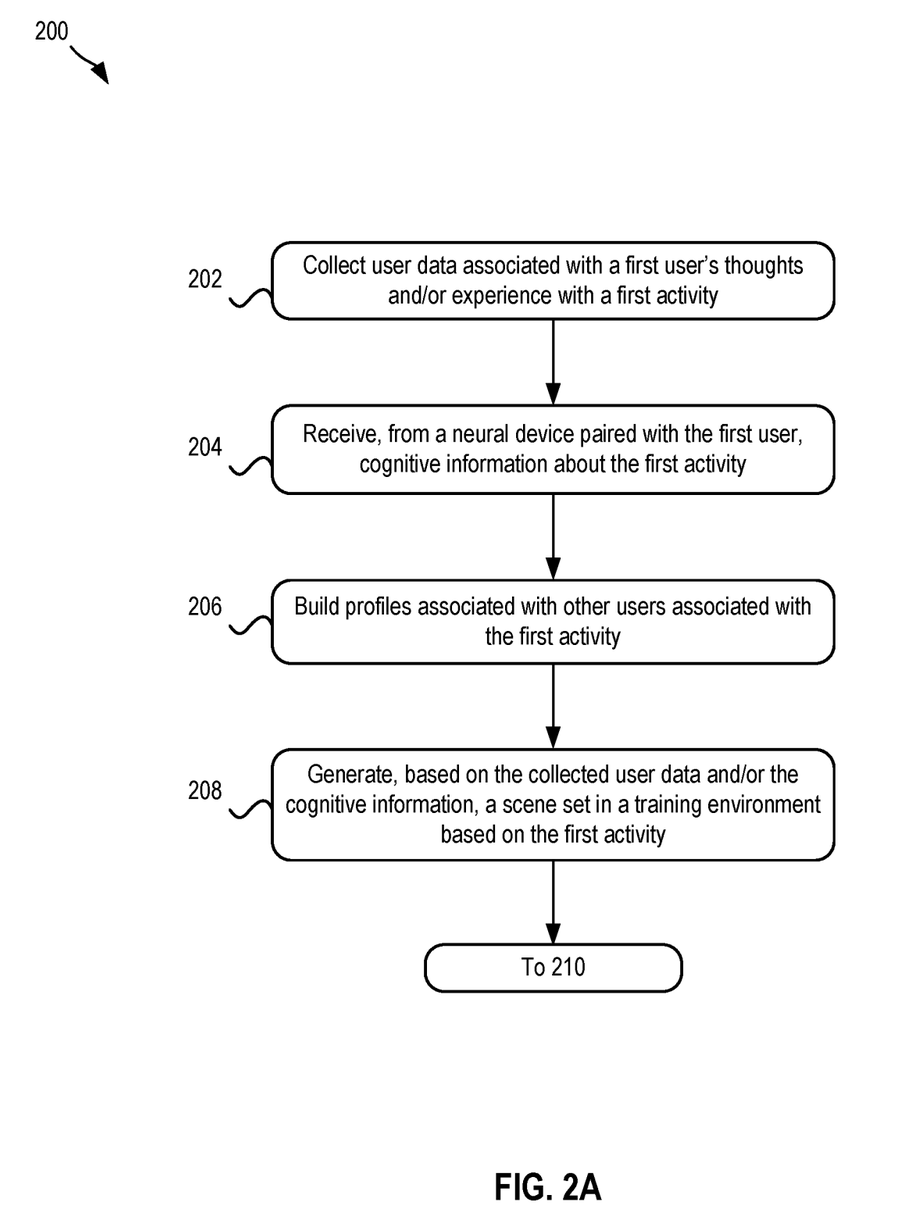
FIG. 2A is a flowchart of a method, in accordance with one embodiment of the present invention.

Now referring to FIG. 2A, a flowchart of a method 200 is shown, according to one embodiment. The method 200 may be performed in accordance with the present invention in any of the environments depicted in FIGS. 1-4, among others, in various embodiments. Of course, more or fewer operations than those specifically described in FIG. 2A may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes collecting user data associated with a first user's thoughts and/or experience with a first activity. It should be noted that, in preferred approaches, user data associated with the first user is only collected after gaining permission to do so, e.g., an opt-in condition that the first user accepts.

The first activity may, in some approaches, be predetermined. For example, a search for user data of a predetermined first activity may, in some approaches, be performed on a collection of user data associated with the first user. In some other approaches, the first activity is not known upon initiating a search of user data associated with the first user, and instead, in some approaches, the first activity is determined, e.g., based on a determination that at least a predetermined amount of the user data is associated with the first activity. The aforementioned user data may be collected in any manner that would become apparent to one skilled in the art after reading the present disclosure. For example, in various approaches, the user data may be collected via, e.g., user input of the user data, querying a database of user information, by receiving user data from a source of the user data in real time, executing predetermined data mining algorithms on a target data source, etc.

The first activity may depend on the approach, and may include any type of activity. In one preferred approach, the first activity includes playing, e.g., competing in, practicing in, etc., a predetermined type of sport, e.g., cricket, basketball, soccer, tennis, fencing, etc. In another approach, the first activity may include attending a business meeting, a job interview, a school speech, etc. In yet another approach, the first activity may include attending a social event.

The user data associated with the first user's thoughts and/or experience with a first activity may, in some approaches, include cognitive information, e.g., thoughts, impulses, subliminal thoughts, dreams, etc., that are collected and/or received from a neural device paired with the first user. In some other approaches, the user data may include, writings, voice memos and/or conversations, etc., which may be collected from devices including, but not limited to, e.g., personal internet of things (IoT) devices, smart home devices, web applications, mobile applications, etc. In yet another approach, the user data may be based on historical events of the first activity, which may be based on recordings of the first user participating in such historical events, discussions about such historical events, reviews of the first user's performance in the historical events made by other users, etc.

Operation 204 includes receiving, from a neural device paired with the first user, cognitive information about the first activity. The neural device may be any neural device that would become apparent to one skilled in the art after reading the present descriptions. For example, the neural device may be of a type known in the art, configured to capture the relevant information noted herein. In one specific approach, the neural device may be a device associated with a predetermined brain controlled interface, e.g., such as NEURALINK. In some approaches, the neural device is implanted in a portion of the first user's head and/or brain to establish the pairing. This way, the neural device is configured to determine at least some cognitive information from the first user. In some approaches, this cognitive information includes, e.g., thoughts, fears, likes, dislikes, confidence, experiences, etc., For example, this cognitive information may, in some approaches, include information about the first activity. This cognitive information is, in some approaches, received, from the neural device paired with the first user. As will now be described below, in some approaches, the cognitive information may include one or more indications of themes that the first user would like to base the practice of the first activity on.

Figure 2B:
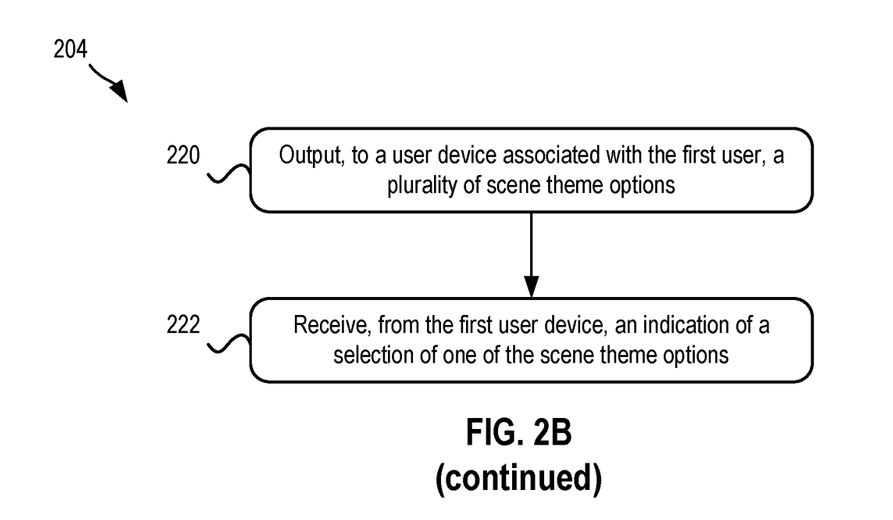
FIG. 2B is a flowchart of sub-operations of an operation of the flowchart of FIG. 2A, in accordance with one embodiment of the present invention.

Looking to FIG. 2B, exemplary sub-operations for determining cognitive information are illustrated in accordance with one embodiment, one or more of which may be used to perform operation 204 of FIG. 2A. For example, sub-operation 220 includes outputting, to a user device associated with the first user, a plurality of potential scene theme options. In some approaches, the user device associated with the first user is the neural device paired with the first user. In another approach, the user device associated with the first user is a known type of user device that includes a display for displaying the plurality of potential scene theme options. In such an approach, the first user may log into a predetermined system in which the plurality of potential scene themes are contained, and several of the potential scene themes may be displayed for the first user to select one or more of. The potential scene theme options may, in some approaches, be based on a target time based scenario. For example, the potential scene theme may have a target, e.g., a goal to score on, and the target time based scenario may pose a countdown in which the first user is to score a goal on the target. In another approach, the potential scene theme options may additionally and/or alternatively include target psychological conditions. For context, one or more of the potential scene themes, e.g., the psychological conditions, may be based on a user's thoughts and thought correlations with various conditions, which may be determined from, e.g., cognitive information, survey results, selections, etc., of the user. For example, these may include conditions that the first user is determined, e.g., from neural synapses and/or brainwave function detected using the neural device, to be uncomfortable with and thereby would benefit from practicing in. For example, the first user may be uncomfortable with networking in a networking room setting that includes more than ten people. Such a psychological condition may, in some approaches, be determined from cognitive information received from the neural device, and thereby be included as one of the several potential scene themes for the first user to potentially select. Note that, by basing a scene for the first user to practice the first activity in, such psychological fears of the first user may be intentionally elicited, to thereby promote practice and enable the user to gain user confidence. In another approach, the potential scene theme options may additionally and/or alternatively include a target physical condition based scenario. For example, the target physical condition based scenario may include, e.g., verbally or physically preparing for a job interview, practicing a physically based athletic move, practicing playing defense in a player/team match of a sports activity, etc. In another approach, the potential scene theme options may additionally and/or alternatively include a random scenario, e.g., include a random scenario which may be based on a randomly determined one or more combinations of the scene themes described above.

An indication of a selection of one of the scene theme options may be received from the first user device, e.g., see sub-operation 222.

Method 200 includes optionally building profiles associated with other users associated with the first activity, e.g., see operation 206. Note that in some approaches, the first user personally knows at least some of the other users. In some other approaches, at least some of the other users are not personally known to the first user, e.g., professional athletes, celebrities, animals, etc. In some approaches in which the first activity is a sporting activity, method 200 may include creating profiles of various known players from different sports based on the first user's strengths, weaknesses, physical and mental fitness under various conditions, playing styles in various mental and environmental conditions, etc. This way, even in situations in which the first user is alone and/or is not able to find another person to practice the first activity with, other players based on the built profiles may be incorporated into a generated scene that is presented to the first user, e.g., see operation 208 below.

Operation 208 includes generating a scene that is set in a training environment. The scene and/or the training environment may be based on the first activity. For context, the training environment may be a location where the first user is able to practice the first activity at least to some extent, e.g., such as a field, the user's living room, a conference room, a classroom, etc. The generated scene may be set in, e.g., caused to be displayed within the training environment and thereby add detail to the training environment. For example, such detail may be established by setting contents such as other users, portrayals of weather conditions, etc. in the training environment. Causing such detail to be added to the training environment thereby creates a visualization of contents of the scene that causes the training environment to constitute relatively much more than just a field, a conference room, etc. In some approaches, the scene combines various inputs taken from the user. For example, in some preferred approaches, the scene is generated based on the collected user data and/or based on the cognitive information. As a result of the scene being generated based on information associated with the first user, the proposed system simulates a target environment in which a profile of the user maps to a selected target environment, thereby enabling the first user to practice the first activity. In some approaches, the generated scene may additionally and/or alternatively simulate future target conditions that the first user may physically participate in the first activity. For example, conditions such as forecasted weather may be identified and incorporated during the generation of the scene. Other conditions may additionally and/or alternatively be incorporated into the generation of the scene. For example, the received cognitive information may, in some approaches, indicate at least one aspect of the first activity that the first user is uncomfortable with, e.g., a first aspect. More specifically, the first user may be uncomfortable based on the first user lacking confidence with respect to the first aspect while participating in the first activity. Accordingly, the first aspect may be incorporated into the generated scene thereby enabling the first user to gain experience with the first aspect of the first activity. In some illustrative approaches, such aspects may include, e.g., an emotional condition of the first user, a mental condition of the first user, audience reactions, etc.

The generated scene may, in some approaches, include one or more of the other users that are generated based on the built profiles associated with the other users associated with the first activity. For example, a second user based on a first of the built profiles may be included in the generated scene as a participant for participating in the first activity with the first user.

In some approaches, the scene is generated based on the selected scene theme. This way, the scene is caused to include productivity conditions for training the first user's skill with respect to the first activity and the selected scene theme. One or more of these scene themes may be selected, and thereby triggered, based on input received, e.g., from a user selection, cognitive information obtained from a neural device, etc. Various illustrative examples below detail how, in some approaches, the scene may be generated based on a selected one of the potential scene themes.

In some approaches, the scene may include a scene theme that is generated based on a target time based scenario. Such a scene theme may be predicted and generated based on a target time that the first user is thinking of the future scene, e.g., determined from the cognitive information. One or more scene generation models that are used to generate the scene may consider data inputs such as weather data, smart home data, predicted mental and physical events at the target time, social media data to predict audience reactions, etc. Based on all these parameters, an associated scene is, in some approaches, generated using one or more generative artificial (AI) model(s). As will be described in greater detail elsewhere below, e.g., see operations 210 and 212, the generated scene may be input into, e.g., output to, hologram devices and/or robotic devices to generate a physical surrounding replicating the scene.

In some other approaches, the scene may include a scene theme that is generated based on a target player/team based scenario. In one or more of such approaches, the scene may be generated based on the target player/team that the first user thinks of in an imagined future scene. Information used to generate such a scene may be predicted and/or determined from the user data and/or cognitive data. At least one, and potentially multiple other user profiles may be considered in one or more of these approaches, and interaction among the users may be predicted based on historic data. Scene generation models may consider information, e.g., data points like weather data to generate players reactions to weather changes, smart home data of cluster of players to generate physical and mental conditions of individuals, location data to replicate player strengths, etc. Based on all these parameters, an associated scene may be, in some approaches, generated using one or more artificial intelligence (AI) model(s). The generated scene may be input into, e.g., output to hologram devices and/or robotic devices to generate a physical surrounding replicating the scene.

A scene may additionally and/or alternatively be generated based on a target physical condition based scenario, in some approaches. In one or more of such approaches, the scene may be generated based on current physical conditions of the first user and based on an analysis of the first user. Expected physical conditions of the first user at the target time, target practice location place, etc., may be determined and used for generating the scene. For example, user information may be collected that indicates an amount of exercise that the first user has performed within a predetermined amount of time, e.g., over the last month. This way, physical conditions of the user at a future time, e.g., a next practice session, may be determined and incorporated into the scene generation. Incorporation of this information, in one approach, includes basing physical traits, e.g., athletic strengths, and relative skill levels of the other players in the generated scene to be relatively better than physical traits and relative skill levels associated with the first user. This way, the first user is physically and mentally pushed to improve in a relatively challenging competition. Based on these parameters, an associated scene may be, in some approaches, generated using one or more AI model(s). The generated scene may be input into, e.g., output to hologram devices and/or robotic devices to generate a physical surrounding replicating the scene.

A scene may additionally and/or alternatively be generated based on a target emotional condition based scenario, in some approaches. In one or more of such approaches, the scene may be generated based on historical data associated with the first user, e.g., such as screen time, applications data, smart home data, etc. The scene may additionally and/or alternatively be generated based on an evaluation of mental conditions of the first user. Based on these parameters, an associated scene may be, in some approaches, generated using one or more AI model(s). The generated scene may be input into, e.g., output to, hologram devices and/or robotic devices to generate a physical surrounding replicating the scene.

A mixed conditions based scenario may additionally and/or alternatively be incorporated into the generated scene, in some approaches. Here, a combination of scenarios may be picked by the first user allowing for the scenario to be automatically generated thereafter. A random scenario generation operation may be performed in method 200, in some approaches. Here, it may be predicted what the first user would benefit from and a scenario for the first user may be randomly selected, e.g., one or more of the above scenarios may be randomly selected.

The generated scene is, in some approaches, output to a hologram device for displaying the scene for the first user, e.g., see operation 210. For example, in some approaches in which the scene is based on one or more of the built profiles associated with the other users associated with the first activity, the scene displayed to the first user may include a holographic second user that is displayed by a hologram display device. This way, the first user is able to interact with other users, despite potentially having access to other human users to practice the first activity with. In some approaches, the generated scene may additionally and/or alternatively incorporate one or more physical aspects that allow the first user to visualize and practice the first activity. For example, instructions for incorporating a physical aspect into the generated scene may be output to a robotic device, e.g., see operation 212. In one preferred approach, the physical aspect is based on control of athletic equipment. For example, in some approaches in which the first activity is a sports-based activity, the instructions may specify to a robotic device how to interact with a sports ball with respect to the first user, e.g., to play catch with the user, to block attempted scoring shots at a goal that the robotic device is positioned in front of, to attempt to hit a ball that the first user pitches to the robotic device, etc. In one or more of such approaches, the hologram device may cast a hologram over the robotic device to create an appearance that the robotic device is one of the other users, the second user. This way, the operations of method 200 and the holograms and/or robotic devices bring about an environment in which the first user is able to virtualize practicing the first activity against a selected player profile. In some approaches, personalized holograms may be created with robotic devices which mimic a target player in a sports related field. As will now be described below, hologram devices that display these holograms are preferably caused, e.g., instructed, to continually adjust a relative position of the other users and/or other aspects of the generated scene.

The generated scene is caused to be reactive, in some approaches. For example, the generated scene may be caused to be reactive according to determined movement of the first user. In some approaches, a scenario that the first user is determined to be thinking of at a point in time may be captured using the neural device, and the scenario will automatically be caused to be displayed for the user using robotic devices and holograms. These holograms preferably are caused to dynamically adjust as per the first user's movement. To trigger certain emotional conditions dynamically on the fly while the first user is performing a certain activity, brain computer interfaces (BCIs) may be used, and these conditions may be caused to automatically be generated on the ground.

In some approaches, method 200 includes detecting a predetermined user gesture made by the first user while interacting with the generated scene, e.g., see operation 214. A behavior of the second user in the generated scene may be adjusted based on the detected predetermined user gesture, e.g., see operation 216. For example, in one approach, the gesture may include the first user placing their hand in the air, e.g., thereby indicating that the first user wants to be passed a ball that is illustrated as being currently held by the second user. In response thereto, the second user may be caused within the generated scene to pass the first user the ball, e.g., by instructing the robotic device to throw the ball to the first user and by instructing the hologram device to cause a hologram of the second user to act out throwing the ball to the first user. The predetermined user gesture may additionally and/or alternatively include, e.g., hand gestures, textual commands, etc., that are recognized and in response thereto the conditions of the generated scene are caused to be adjusted. In some multi-user scenarios, an optional operation of method 200 may include automatically adjusting the generated scene, which may be caused by coordinating with the other users involved in the change, e.g., issuing instructions to the hologram device to change a behavior of and/or positioning of the other users. Note that, in some approaches, received user preferences may be used to further customize the generated scene using hand gestures, textual commands, etc., and the generated scene may be automatically generated using robotic devices and holography techniques that would become appreciated by one of ordinary skill in the art upon reading the descriptions herein.

One or more operations of method 200 may, in some approaches, be performed using a trained AI model. For example, method 200 optionally includes training an AI model to generate a scene based on data, e.g., user data, cognitive information, etc. According to some illustrative approaches, the AI model may be trained using known AI techniques, e.g., predictive analytics, recommendation engines, anomaly detection, time series analysis, etc. This way, holography, robotic devices, internet of things and brain-controlled interfaces (BCIs), etc., may be controlled, e.g., instructed by the AI model to enable the benefits described herein. Furthermore, with the help of BCI techniques, the first user's thinking is enabled to be mapped into a real life scenario for practicing a particular activity such as a sport. In some approaches, the AI model may additionally and/or alternatively be trained to profile a user to thereby establish user characteristics such as strengths, weaknesses, physical and mental fitness conditions, etc. Based on a target condition that the first user is determined to think of, target profiling may be performed and target characteristics, e.g., such as pitch, other users, weather conditions, psychological conditions may be drawn. Accordingly, the scene set in the training environment based on the first activity may be generated using the trained AI model.

In some approaches, the operations of method 200 may be performed by an AI model that is trained using a predetermined training set of data. For example, in some approaches, various of the operations noted above may be deployed in a trained state of a trained AI model. Training of the AI model, in some approaches, may be performed by applying a predetermined training data set to learn how to process received information such as the cognitive information and/or collect and process information such as the user data. Initial training may include reward feedback that may, in some approaches, be implemented using a subject matter expert (SME) that generally understands the scene that should be generated based on the training data. However, to prevent costs associated with relying on manual actions of a SME, in another approach, reward feedback may be implemented using techniques for training a BERT model, as would become apparent to one skilled in the art after reading the present disclosure. Once a determination is made that the AI model achieved a redeemed threshold of accuracy of performing the operations described herein during this training, a decision that the model is trained and ready to deploy for performing techniques and/or operations of method 200 may be performed. In some further approaches, the AI model may be a neuromyotonic AI model that may improve performance of computer devices in an infrastructure associated with generating the scene and causing the scene to be displayed, because the neuromyotonic AI model may not need an SME and/or iteratively applied training with reward feedback in order to accurately perform operations described herein. Instead, the neuromyotonic AI model is configured to itself make determinations described in operations herein. Weight values may, in some approaches, be used by the AI reasoning model to collect and analyze information and/or feedback potentially received by the first user about the generated scene in the training environment. Such an AI model allows a user's neural thoughts to be processed and used in the generation of a scene, where the scale of such analysis and determinations would not otherwise be feasible for a human to perform. This is because humans are not able to efficiently generate and dynamically adjust a scene at a speed that neural information ongoingly changes. Accordingly, management of operations described herein is not able to be achieved by human manual actions.

Several additional benefits that are enabled as a result of implementing the techniques described herein are based on reductions of computational operations that the techniques described herein enable. For example, it should be noted that there are relatively great accuracies that are provided as a result of determining information to base a generated scene on directly from the first user's cognitive information. For this reason, the techniques described herein reduce an amount of computer processing that would otherwise be performed without considering such information. This is because by not considering cognitive information obtained from the user, determining a scene that accurately is suited to a user would otherwise require iterations of applying user feedback. However, it should be noted that, even such iterations of applying user feedback would not achieve the benefits of generated scenes described herein, because the first user may not know and/or be able to determine conditions of a generated scene that would improve the first user's abilities with respect to the first activity.

Techniques described herein also reduce power consumption and reduce an amount of processing operations that are otherwise performed in displaying a scene to a user. For example, typical conventional display implementations include virtual reality displays and controllers, which otherwise require an extensive number of components and power consumption when compared to the hologram devices described herein.

Figure 3:
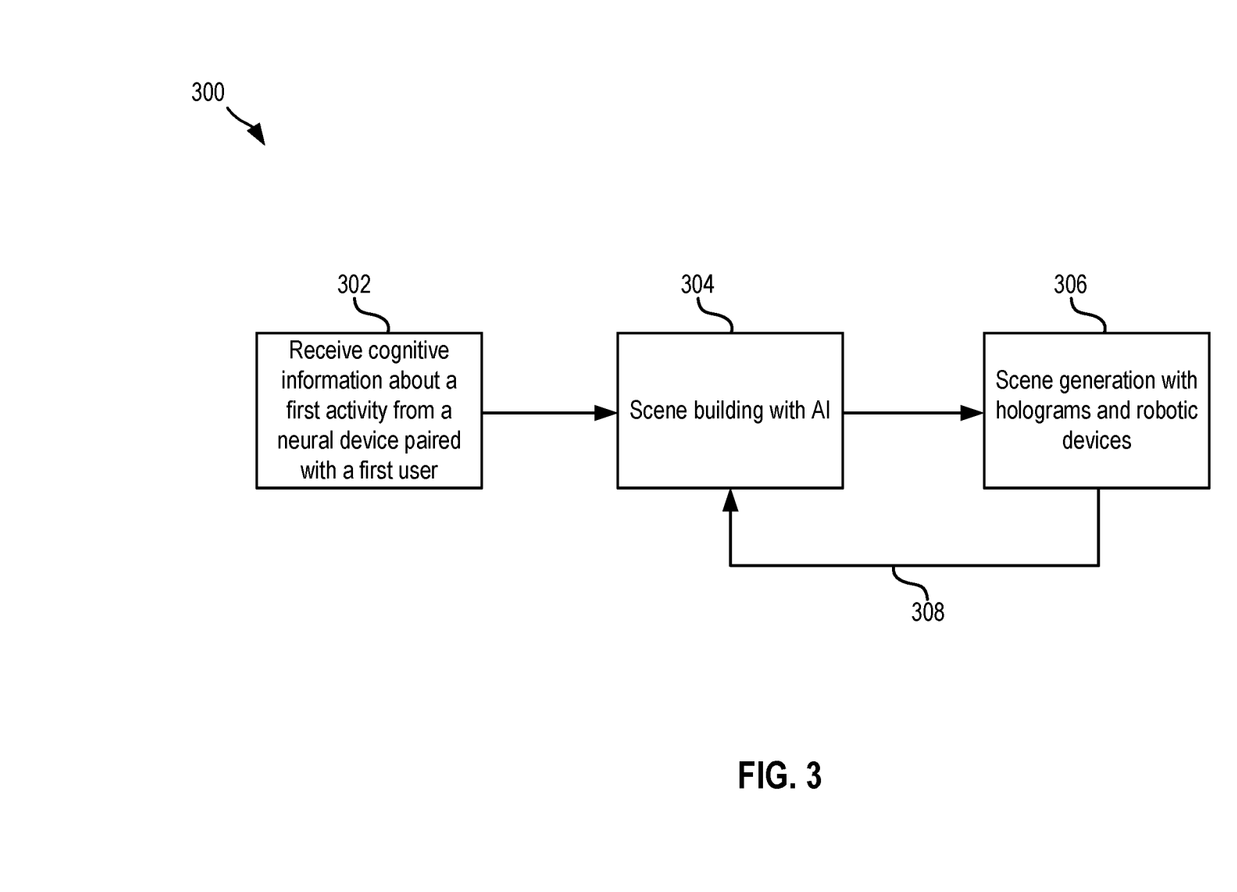
FIG. 3 is a flowchart of a method, in accordance with one embodiment of the present invention.

Looking to FIG. 3, exemplary operations for using cognitive information and an AI model to generate a scene set in a training environment are illustrated, in accordance with one embodiment. The method 300 may be performed in accordance with the present invention in any of the environments depicted in FIGS. 1-4, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 illustrates an iteratively applied AI training model approach. One or more operations of method 300 may be performed using techniques described elsewhere herein, e.g., see method 200, and/or one or more operations of method 300 may be incorporated into method 200. Operation 302 of method 300 includes receiving cognitive information about a first activity from a neural device paired with a first user. The cognitive information may be input into a trained AI model that is configured to build a scene set in a training environment based on the first activity, e.g., see operation 304. Instructions for causing the scene to be displayed for the user may be output, e.g., see operation 306. For example, the generated scene may be output to a hologram device for displaying the scene for the first user. Operation 308 includes receiving reward feedback and/or predetermined gesture information that may be used to cause the generated scene to be dynamically ongoingly adjusted.

Figure 4:
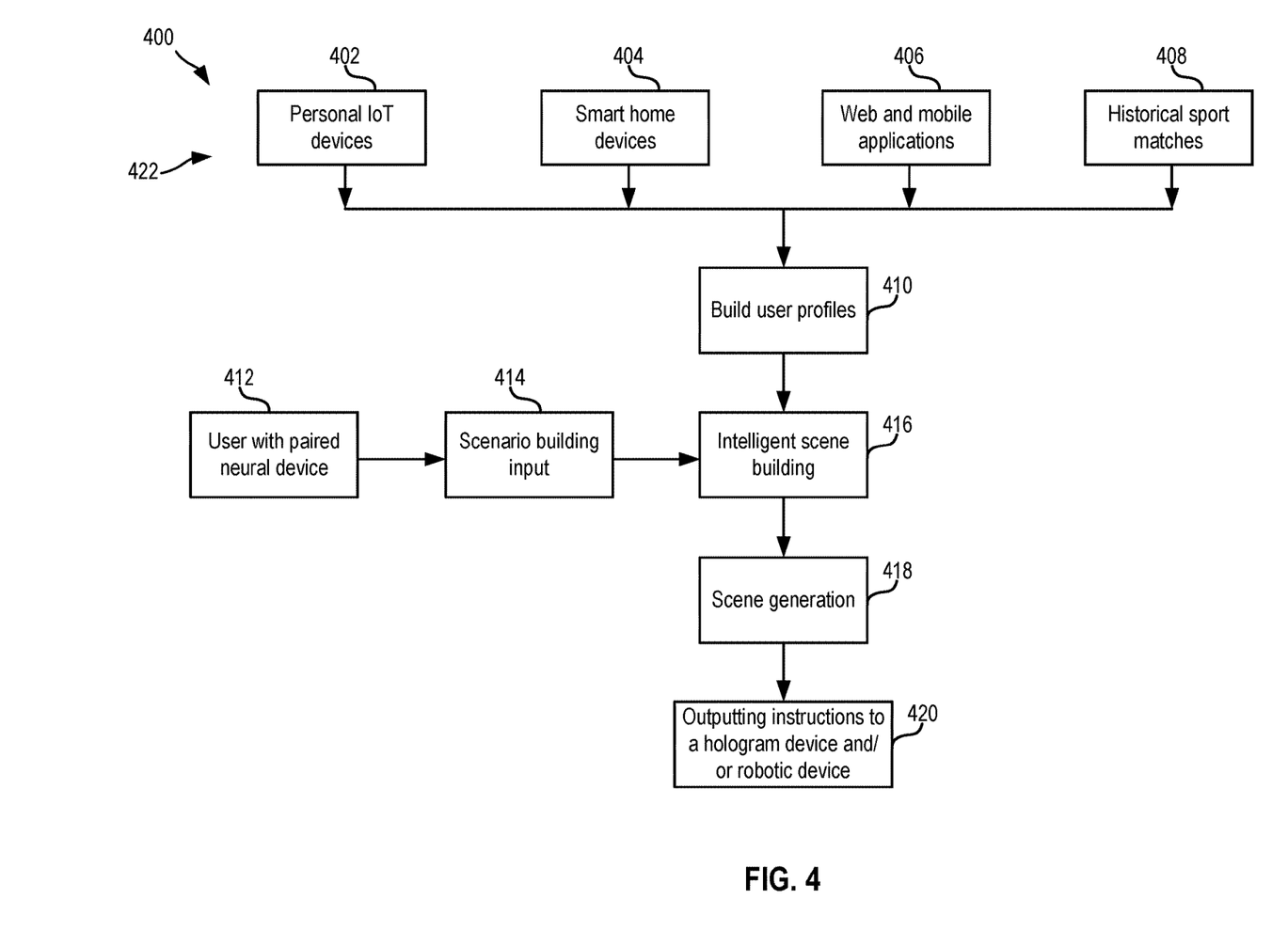
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-4, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 422 of method 400 includes collecting user data associated with a first user's thoughts and/or experience with a predetermined first activity, e.g., a sports related activity in the current embodiment. In one or more approaches, the user data may be collected from sources such as, e.g., personal IoT devices 402, smart home devices 404, web and mobile applications 406, historical sport matches 408, etc.

Operation 410 includes building user profiles associated with other users associated with the first activity. For example, a second user based on a first of the built profiles may be built to thereafter be included in a scene generated based on the first activity, e.g., see operation 418.

In some approaches, the first user has a neural device 412 that is paired with the first user. Operation 414 includes receiving cognitive information about the first activity from the neural device 412. In operation 416, this information and/or other information may be input into an intelligent scene building model which, in some approaches, may be a trained AI model, e.g., such as the trained AI model described elsewhere above.

Operation 418 includes generating, based on the collected user data and the cognitive information, a scene set in a training environment based on the first activity. Operation 420 includes outputting instructions to a hologram device and/or robotic device to display the generated scene for the first user.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    collecting user data associated with a first user's thoughts and/or experience with a first activity;
    receiving, from a neural device paired with the first user, cognitive information about the first activity, wherein the cognitive information is captured by the neural device from dreams of the first user;
    generating, based on the collected user data and the cognitive information, a scene set in a training environment based on the first activity;
    adding detail to the training environment that simulates future target conditions that the first user is expected to experience while physically participating in the first activity; and
    outputting the generated scene to a hologram device for displaying the scene for the first user.

2. The computer-implemented method of claim 1, comprising: building profiles associated with other users associated with the first activity, wherein a second user based on a first of the built profiles is included in the generated scene.

3. The computer-implemented method of claim 2, comprising: detecting a predetermined user gesture made by the first user while interacting with the generated scene; and adjusting a behavior of the second user in the generated scene based on the detected predetermined user gesture.

4. The computer-implemented method of claim 1, wherein the first activity is selected from the group consisting of: attending a business meeting, a job interview, and a school speech.

5. The computer-implemented method of claim 1, wherein the collected user data is collected from devices selected from the group consisting of: personal internet of things (IoT) devices, smart home devices, web applications, and mobile applications.

6. The computer-implemented method of claim 1, wherein the neural device is associated with a predetermined brain controlled interface and is implanted in a first portion of the first user's head to establish the pairing, and comprising: determining a plurality of different target psychological conditions that the first user is uncomfortable with, wherein the different target psychological conditions are determined from the cognitive information received from the neural device, wherein the cognitive information is determined from neural synapses and/or brainwave functions detected by the neural device; outputting, to a user device associated with the first user, a plurality of scene theme options that are based on different target psychological conditions; and receiving, from the user device, an indication of a selection of one of the scene theme options, wherein the generated scene is based on the selected scene theme.

7. The computer-implemented method of claim 1, comprising:
    training an artificial intelligence (AI) model to generate a scene based on user data, wherein the scene set in the training environment based on the first activity is generated using the trained AI model.

8. The computer-implemented method of claim 1, wherein the cognitive information is captured by the neural device from dreams of the first user, wherein the cognitive information indicates a first aspect of the first activity that the first user is uncomfortable with, wherein the first aspect is incorporated into the generated scene for thereby enabling the first user to gain experience with the first aspect of the first activity.

9. The computer-implemented method of claim 1, comprising: outputting, to a robotic device, instructions for incorporating a physical aspect into the generated scene, wherein the physical aspect is based on control of athletic equipment.

10. A computer program product, the computer program product comprising a computer readable storage medium having program instructions embodied therewith, the program instructions readable and/or executable by a computer to cause the computer to:
    collect, by the computer, user data associated with a first user's thoughts and/or experience with a first activity;
    receive, by the computer, from a neural device paired with the first user, cognitive information about the first activity, wherein the cognitive information is captured by the neural device from dreams of the first user;
    generate, by the computer, based on the collected user data and the cognitive information, a scene set in a training environment based on the first activity;
    add, by the computer, detail to the training environment that simulates future target conditions that the first user is expected to experience while physically participating in the first activity; and
    output, by the computer, the generated scene to a hologram device for displaying the scene for the first user.

11. The computer program product of claim 10, the program instructions readable and/or executable by the computer to cause the computer to: build, by the computer, profiles associated with other users associated with the first activity, wherein a second user based on a first of the built profiles is included in the generated scene.

12. The computer program product of claim 11, the program instructions readable and/or executable by the computer to cause the computer to: detect, by the computer, a predetermined user gesture made by the first user while interacting with the generated scene; and adjust, by the computer, a behavior of the second user in the generated scene based on the detected predetermined user gesture.

13. The computer program product of claim 10, wherein the first activity is selected from the group consisting of: attending a business meeting, a job interview, and a school speech.

14. The computer program product of claim 10, wherein the collected user data is collected from devices selected from the group consisting of: personal internet of things (IoT) devices, smart home devices, web applications, and mobile applications.

15. The computer program product of claim 10, the program instructions readable and/or executable by the computer to cause the computer to: determine, by the computer, a plurality of different target psychological conditions that the first user is uncomfortable with, wherein the different target psychological conditions are determined from the cognitive information received from the neural device, wherein the cognitive information is determined from neural synapses and/or brainwave functions detected by the neural device; output, by the computer to a user device associated with the first user, a plurality of scene theme options that are based on different target psychological conditions; and receive, by the computer from the user device, an indication of a selection of one of the scene theme options, wherein the generated scene is based on the selected scene theme.

16. The computer program product of claim 10, the program instructions readable and/or executable by the computer to cause the computer to: train, by the computer, an artificial intelligence (AI) model to generate a scene based on user data, wherein the scene set in the training environment based on the first activity is generated using the trained AI model.

17. The computer program product of claim 10, wherein the neural device is associated with a predetermined brain controlled interface and is implanted in a first portion of the first user's head to establish the pairing, wherein the cognitive information indicates a first aspect of the first activity that the first user is uncomfortable with, wherein the first aspect is incorporated into the generated scene for thereby enabling the first user to gain experience with the first aspect of the first activity.

18. The computer program product of claim 10, the program instructions readable and/or executable by the computer to cause the computer to: output, by the computer to a robotic device, instructions for incorporating a physical aspect into the generated scene, wherein the physical aspect is based on control of athletic equipment.

19. A system, comprising:

a processor; and logic integrated with the processor, executable by the processor, or integrated with and executable by the processor, the logic being configured to:

collect user data associated with a first user's thoughts and/or experience with a first activity;

receive, from a neural device paired with the first user, cognitive information about the first activity, wherein the cognitive information is captured by the neural device from dreams of the first user;

generate, based on the collected user data and the cognitive information, a scene set in a training environment based on the first activity;

add detail to the training environment that simulates future target conditions that the first user is expected to experience while physically participating in the first activity; and output the generated scene to a hologram device for displaying the scene for the first user.

20. The system of claim 19, wherein the neural device is associated with a predetermined brain controlled interface and is implanted in a first portion of the first user's head to establish the pairing, and the logic being configured to: build profiles associated with other users associated with the first activity, wherein a second user based on a first of the built profiles is included in the generated scene.

* * * * *